United States Patent
Sugiyama et al.

(10) Patent No.: US 8,746,390 B2
(45) Date of Patent: Jun. 10, 2014

(54) BODY FRAME OF STRADDLE-TYPE VEHICLE

(75) Inventors: Eiji Sugiyama, Saitama (JP); Takashi Sasaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/993,272

(22) PCT Filed: Dec. 12, 2011

(86) PCT No.: PCT/JP2011/078711
§ 371 (c)(1),
(2), (4) Date: Jun. 11, 2013

(87) PCT Pub. No.: WO2012/090692
PCT Pub. Date: Jul. 5, 2012

(65) Prior Publication Data
US 2013/0264795 A1 Oct. 10, 2013

(30) Foreign Application Priority Data
Dec. 27, 2010 (JP) ................................. 2010-290701

(51) Int. Cl.
*B62D 61/02* (2006.01)
*B62K 11/02* (2006.01)
*B62K 19/00* (2006.01)

(52) U.S. Cl.
USPC ......... 180/219; 180/227; 280/274; 280/281.1

(58) Field of Classification Search
USPC ................ 180/219, 227, 220, 228, 229, 230; 280/274, 275, 281.1, 283, 284
See application file for complete search history.

(56) References Cited

U.S. PATENT DOCUMENTS

| 4,753,314 | A | * | 6/1988 | Tsukiji | 180/227 |
| 5,016,725 | A | * | 5/1991 | Muramatsu | 180/225 |
| 5,921,339 | A | * | 7/1999 | Matsuura | 180/219 |
| 6,290,017 | B1 | | 9/2001 | Ito | |
| 7,490,688 | B2 | * | 2/2009 | Yamamoto | 180/228 |

(Continued)

FOREIGN PATENT DOCUMENTS

| JP | 2000-085670 A | 3/2000 |
| JP | 2006-347365 A | 12/2006 |
| JP | 3887107 B2 | 2/2007 |
| JP | 2009-241922 A | 10/2009 |

OTHER PUBLICATIONS

International Search Report of PCT/JP2011/078711, mailing date of Mar. 13, 2012.

*Primary Examiner* — Joseph M Rocca
*Assistant Examiner* — Marc A Scharich
(74) *Attorney, Agent, or Firm* — Westerman, Hattori, Daniels & Adrian, LLP (57) ABSTRACT

A body frame of a straddle-type vehicle is provided with a first cross tube 21 for interconnecting left and right main frames 13 in a right-left direction, and a second cross tube 22 disposed rearwards of the first cross tube 21 and for interconnecting the of left and right main frames 13. A shock absorber mounting portion 23 is mounted so as to interconnect the first cross tube 21 and the second cross tube 22. An extension/contraction axis L1 of a shock absorber 41 and a line L2 passing through an axis of the first cross tube 21 and an axis of the second cross tubes 22 are offset in a side view of a vehicle in a right-left direction.

7 Claims, 7 Drawing Sheets

(56) References Cited

U.S. PATENT DOCUMENTS

| | | |
|---|---|---|
| 7,584,814 B2 * | 9/2009 | Nakanishi .................... 180/227 |
| 7,730,988 B2 * | 6/2010 | Igarashi et al. ............... 180/227 |
| 7,789,186 B2 * | 9/2010 | Shimozato et al. ........... 180/299 |
| 7,900,738 B2 * | 3/2011 | Muramatsu .................. 180/311 |
| 8,104,565 B2 * | 1/2012 | Miyashiro et al. ............ 180/311 |
| 8,118,127 B2 * | 2/2012 | Miyabe ........................ 180/219 |
| 8,657,321 B2 * | 2/2014 | Kashiwai et al. ............. 280/275 |
| 2002/0043415 A1 * | 4/2002 | Okuma et al. ................ 180/225 |
| 2006/0283649 A1 | 12/2006 | Nakanishi |
| 2009/0166115 A1 | 7/2009 | Mizutani et al. |

\* cited by examiner

BODY FRAME OF STRADDLE-TYPE VEHICLE

BACKGROUND OF THE INVENTION

1. Field of the Invention

The present invention relates to a body frame of a straddle-type vehicle.

2. Related Art

Patent Document 1 discloses a straddle-type vehicle in which a shock absorber is provided between a main frame and a swing arm.

In the straddle-type vehicle disclosed in Patent Document 1, in particular when riding on rough terrain, a large load is applied to the shock absorber. Therefore, in order to ensure a rigidity of a body frame at a shock absorber mounting portion, the shock absorber mounting portion has to be heavy and thick, and this enlarges the body frame, resulting in a drawback that a degree of freedom in laying out constituent components of the vehicle is restricted.

PRIOR ART DOCUMENT

Prior Art Document

[Patent Document 1] JP-3887107-B

SUMMARY OF THE INVENTION

One or more embodiments of the invention relate to a body frame of a straddle-type vehicle which can enhance a degree of freedom in laying out constituent components of the vehicle by making a shock absorber mounting portion smaller in size while ensuring a rigidity thereat.

DETAILED DESCRIPTION OF THE EMBODIMENTS

An embodiment of a body frame of a straddle-type vehicle of the invention will be described in detail by reference to the drawings. Note that, the embodiment described herein are not intended to limit the invention but only to exemplify the invention, and all features or combinations of the features of the embodiment are not always essential to the invention.

The drawings are to be seen in a direction in which reference numerals given therein look properly. When used in the following description, front or forward and rear or rearward, left or leftward and right or rightward, and up or upward and down or downward denote respectively directions as viewed from the rider of the vehicle. In the drawings, the front of the vehicle is denoted by Fr, rear by Rr, left by L, right by R, up by U and down by D.

Figure 1:
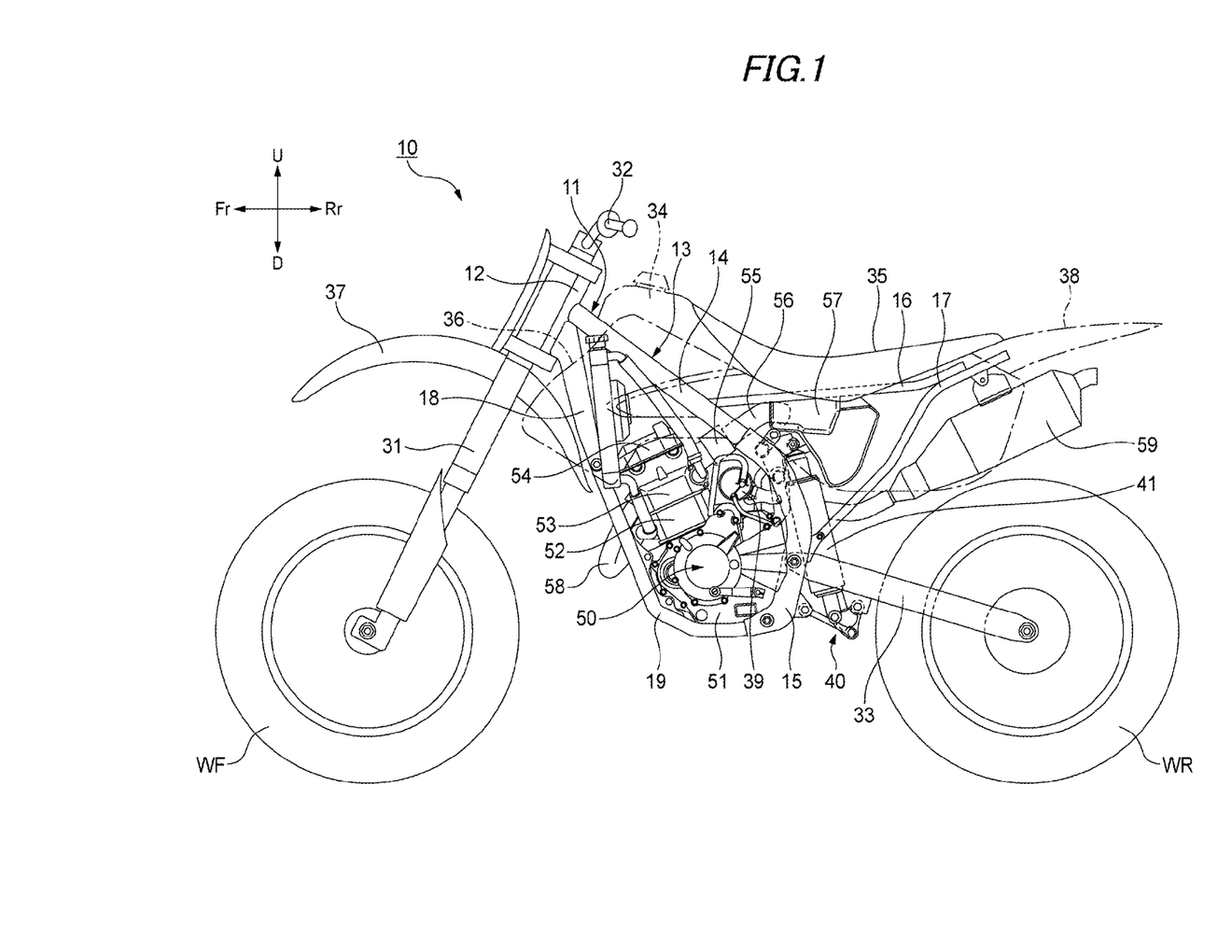
FIG. 1 is a left-hand side view showing a motor cycle on which an embodiment of a body frame of a straddle-type vehicle according to the invention is mounted.

A motor cycle (a straddle-type vehicle) 10 according to this embodiment includes, as shown in FIG. 1, a body frame 11 which includes a head tube 12 provided at a front end of the body frame 11, main frames 13 which are made up of a pair of left and right main tube portions 14 respectively disposed on left and right sides and extending from the head tube 12 obliquely downwards to the rear and a pair of left and right pivot frame portions 15 which are connected to corresponding rear end portions of the pair of left and right main tube portions 14 and which extend downwards, a pair of left and right rear frames 16 which are connected to corresponding rear portions of the pair of left and right main tube portions 14 and which extend to the rear, a pair of left and right sub-frames 17 which are connected to corresponding lower portions of the pair of left and right pivot frame portions 15 and which extend obliquely upwards to the rear, down frames 18 which extend downwards from the head tube 12, and a pair of left and right bottom frames 19 which connect lower end portions of the down frames 18 with lower end portions of the pair of left and right pivot frame portions 15. An engine 50 is mounted on the pivot frame portions 15 and the bottom frames 19.

As shown in FIGS. 2 to 6, the body frame 11 includes a first cross tube 21 which connects together upper portions of the pair of left and right pivot frame portions 15 in a vehicle width or right-left direction, a second cross tube 22 which is disposed closely to the rear of and below the first cross tube 21 and which connects the pair of left and right pivot frame portions 15 together in the right-left direction and a shock absorber mounting portion 23 which is mounted between the first cross tube 21 and the second cross tube 22 so as to connect together the first cross tube 21 and the second cross tube 22 and to which an upper end portion of a shock absorber 41 of a rear suspension system 40, which will be described later.

In addition, the motor cycle 10 includes a front fork 31 which is supported on the head tube 12 so as to be steered freely, a front wheel WF which is supported rotatably at a lower end portion of the front fork 31, a steering handlebar 32 which is mounted at an upper end portion of the front fork 31, a swingarm 33 which is supported on the pivot frame portion 15 so as to swing freely, a rear wheel WR which is supported rotatably at a rear end portion of the swingarm 33, a rear wheel suspension system 40 by which the swingarm 33 is suspended from the shock absorber mounting portion 23, a fuel tank 34 which is mounted on the main tube portions 14, and a seat 35 which is mounted on the rear frames 16. In FIG. 1, reference numeral 36 denotes a fairing, reference numeral 37 denotes a front mudguard and reference numeral 38 denotes a rear mudguard.

Figure 2:
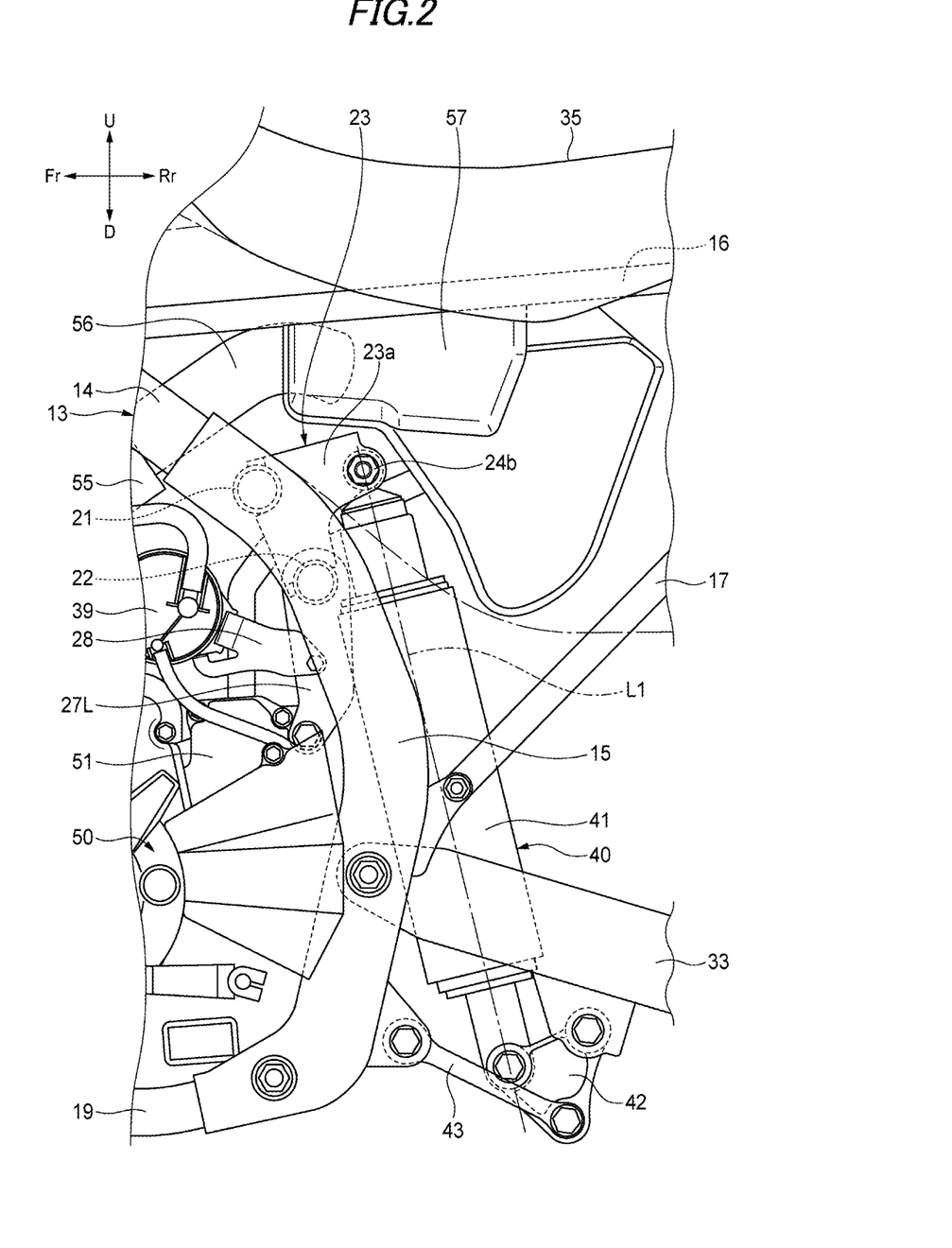
FIG. 2 is an enlarged left-hand side view of a periphery of a shock absorber shown in FIG. 1.

As shown in FIGS. 1 and 2, the rear suspension system 40 includes a shock absorber 41 which is mounted on the shock absorber mounting portion 23 at an upper end portion thereof in a swinging fashion, a first linkage 42 having a substantially triangular shape which connects a lower end portion of the shock absorber 41 with a lower surface of the swingarm 33 in a swinging fashion, and a second linkage 43 which connects the first linkage 42 with a lower end portion of the pivot frame portion 15 in a swinging fashion.

Figure 5:
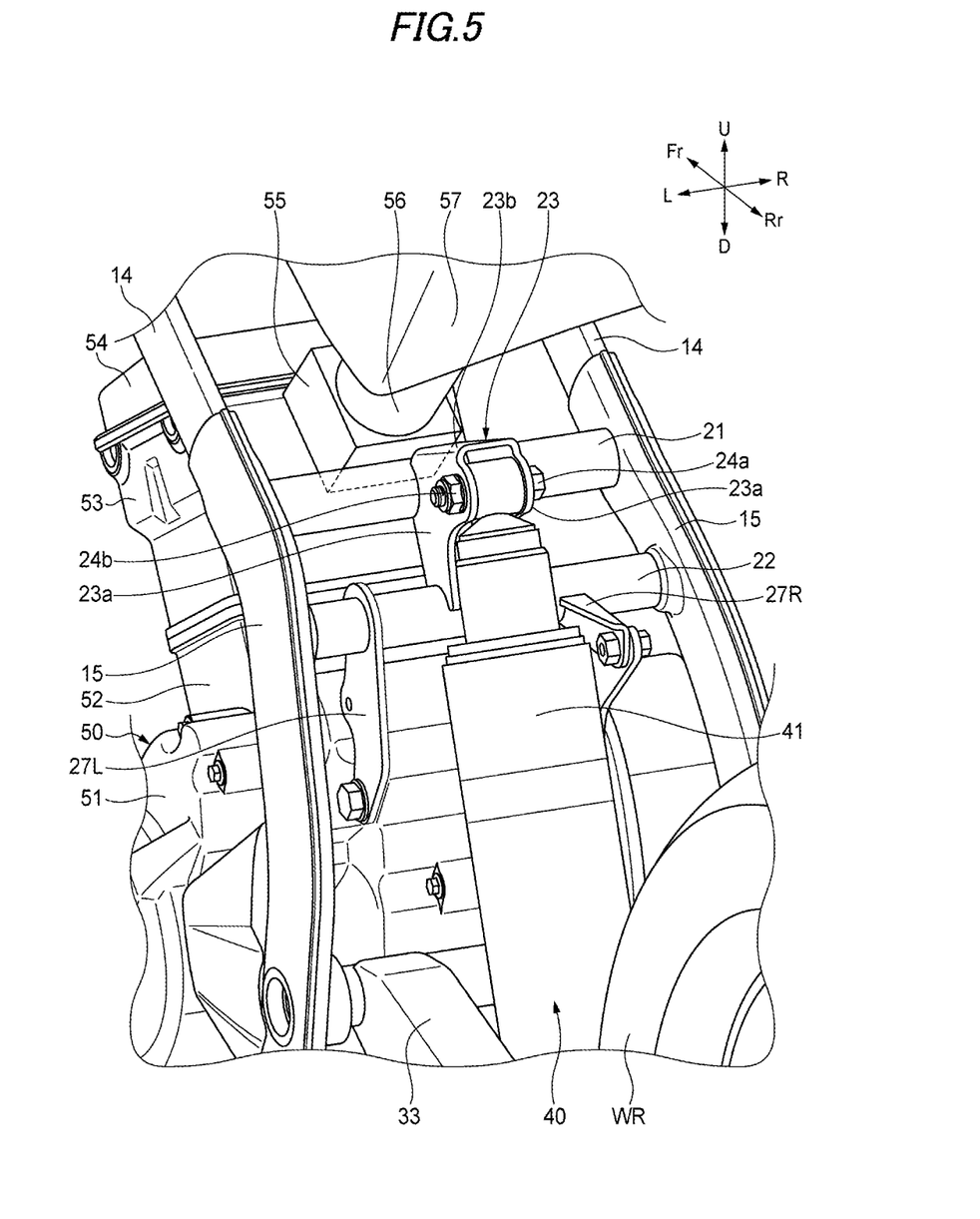
FIG. 5 is a perspective view of the periphery of the shock absorber mounting portion shown in FIG. 3.
Figure 6:
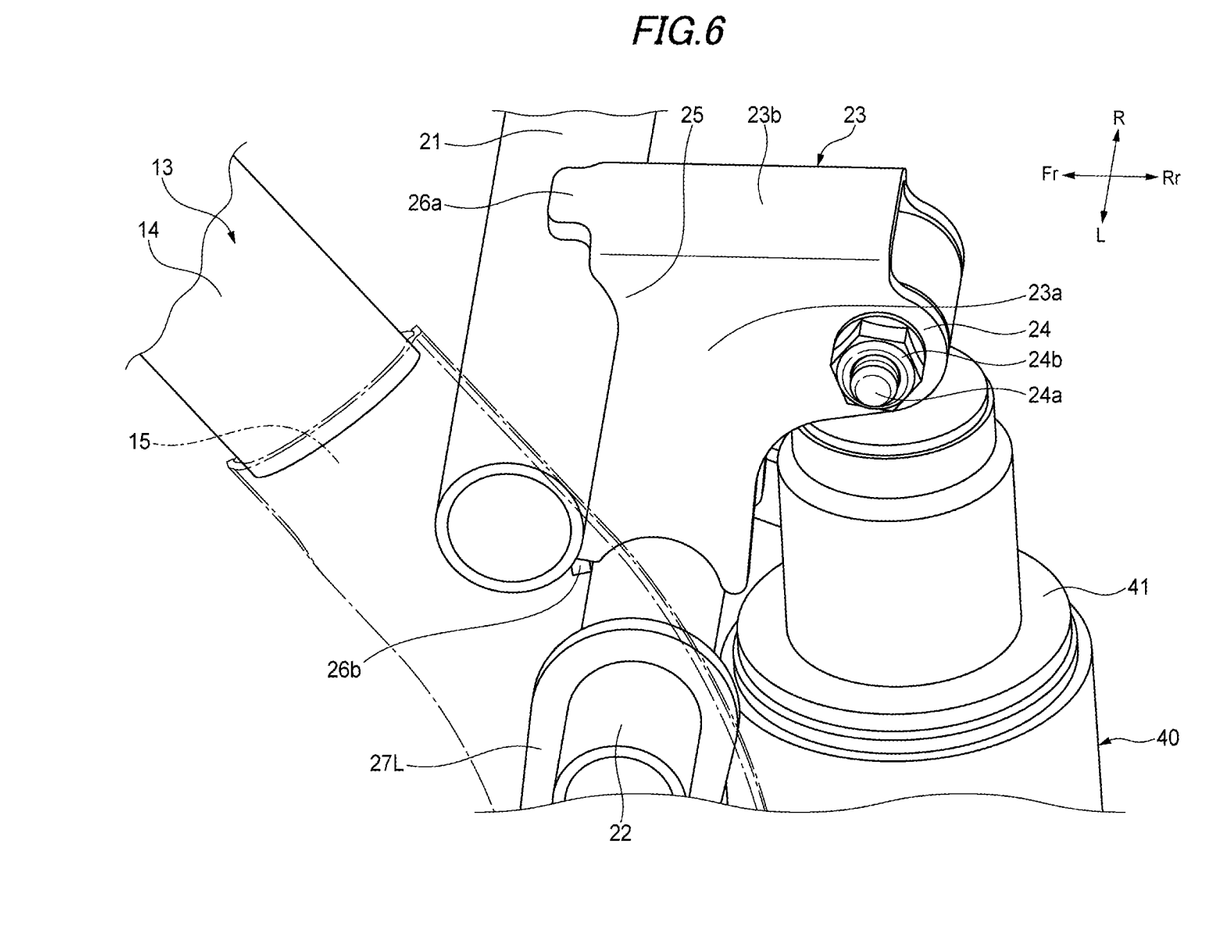
FIG. 6 is an enlarged perspective view of the periphery of the shock absorber mounting portion shown in FIG. 3.

As shown in FIGS. 1 and 5, the engine 50 includes mainly, as constituent components which make up an outer shell thereof, a crankcase 51, a cylinder block 52 which is mounted at a front upper end portion of the crankcase 51, a cylinder head 53 which is mounted at an upper end portion of the cylinder block 52, and a cylinder head cover 54 which covers an upper opening in the cylinder head 53.

In addition, a throttle body 55, a connecting tube 56 and an air cleaner box 57, which make up an engine induction system, are connected sequentially to a back side of the cylinder head 53. The connecting tube 56 is disposed in a space defined below the seat 35 and above the shock absorber mounting portion 23. Additionally, an exhaust pipe 58 and a muffler 59, which make up an engine exhaust system, are connected sequentially to a front side of the cylinder head 53.

The shock absorber mounting portion 23 has, as shown in FIGS. 3 to 6, a pair of left and right plate members 23a each having a substantially inverted L-shape when viewed from the side of the vehicle, an upper plate 23b which connects together uppermost edges of the pair of left and right plate members 23a in the right-left direction, and a front plate 23c which connects together frontmost edges of the pair of left and right plate members 23a in the right-left direction. The shock absorber mounting portion 23 has a substantially U-shaped sectional shape. Additionally, shock absorber pivotally supporting portions 24 are provided at upper rear end portions of the pair of left and right plate members 23a so that an upper end portion of the shock absorber 41 is mounted thereon. Thus, the upper end portion of the shock absorber 41 is fastened to the shock absorber pivotally supporting portions 24 with a bolt 24a and a nut 24b.

The shock absorber mounting portion 23 is welded to the first and second cross tubes 21, 22, and a corner portion 25 of the shock absorber mounting portion 23 is joined to the first cross tube 21 so as to be brought into abutment therewith from thereabove. A first claw portion 26a is formed at a front end portion of the upper plate 23b of the shock absorber mounting portion 23 (a joint portion between the shock absorber mounting portion 23 and the first cross tube 21). This first claw portion 26a extends over part of the first cross tube 21. In addition, a second claw portion 26b is formed at a lower end portion of the front plate 23c (a joint portion between the shock absorber mounting portion 23 and the second cross tube 22). This second claw portion 26b extends towards the front of the second cross tube 22.

Figure 3:
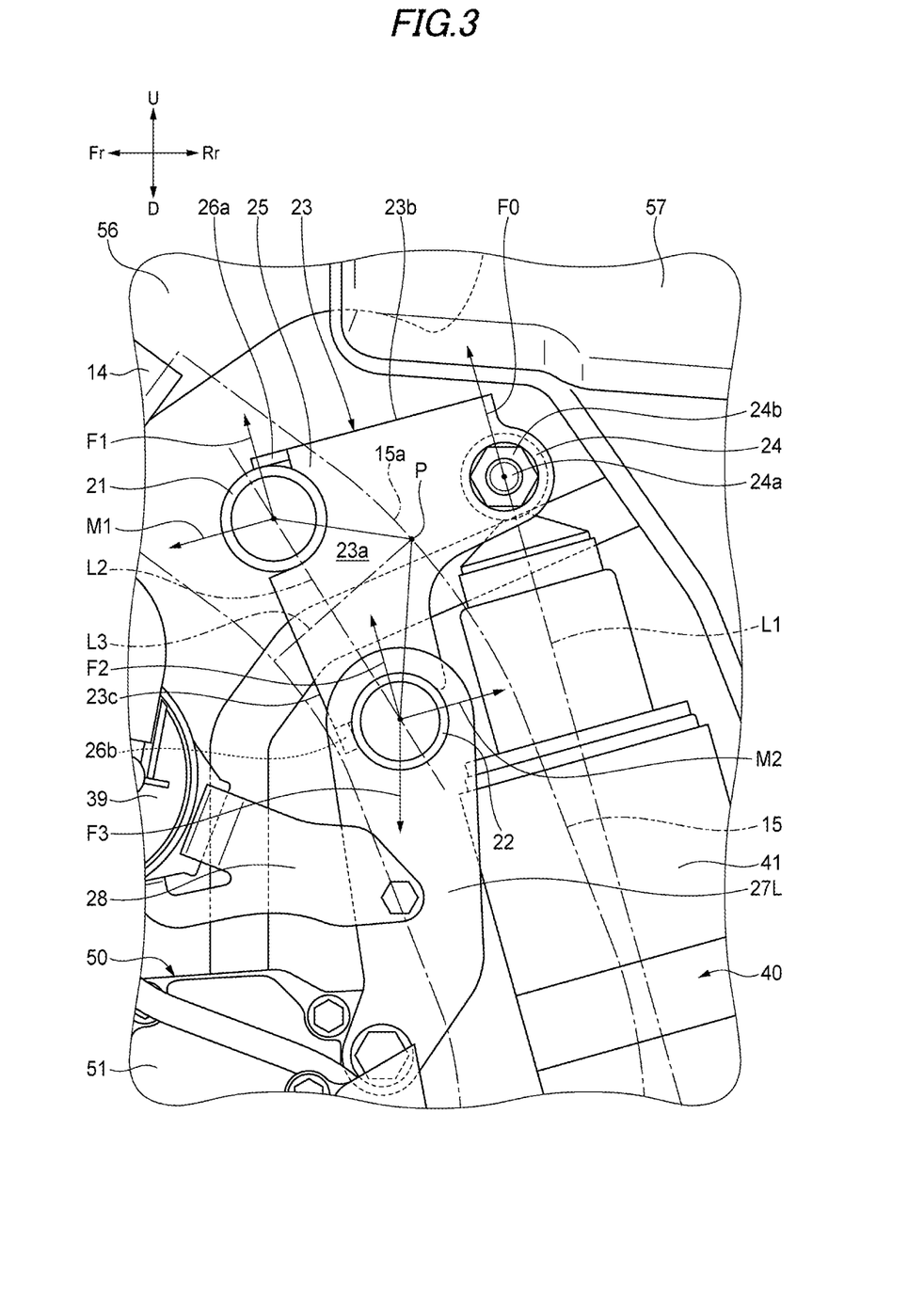
FIG. 3 is an enlarged left-hand side view of the periphery of a shock absorber mounting portion shown in FIG. 2.

As shown in FIG. 3, the shock absorber mounting portion 23 is mounted so that an extension/contraction axis L1 of the shock absorber 41 and a line L2 which interconnects axes of the first and second cross tubes 21, 22 are offset from each other in a vehicle front-to-rear or front-rear direction when viewed from the side of the vehicle.

In the shock absorber mounting portion 23 which is configured as has been described above, when a load F0 is applied to the shock absorber mounting portion 23 from the shock absorber 41, as shown in FIG. 3, loads F1, F2 are applied to the first and second cross tubes 21, 22, respectively, in parallel to the extension/contraction axis L1 of the shock absorber 41 (namely, the load F0 is dispersed to the first and second cross tubes 21, 22). In parallel with this, the loads F1, F2 are converted respectively into moments M1, M2 which work respectively about the joint portions between the shock absorber mounting portion 23 and the first and second cross tubes 21, 22 as fulcrums to thereby be applied to the first and second cross tubes 21, 22, respectively.

In addition, as shown in FIG. 3, the pivot frame portion 15 has a curved portion 15a which curves downwards when viewed from the side of the vehicle. The first and second cross tubes 21, 22 are disposed forwards and rearwards of a center line L3 of the curved portion 15a so that the center line L3 is positioned therebetween. By this arrangement, a triangular construction is formed by the first and second cross tubes 21, 22 and an apex P of the curved portion 15a when viewed from the side of the vehicle.

Figure 4:
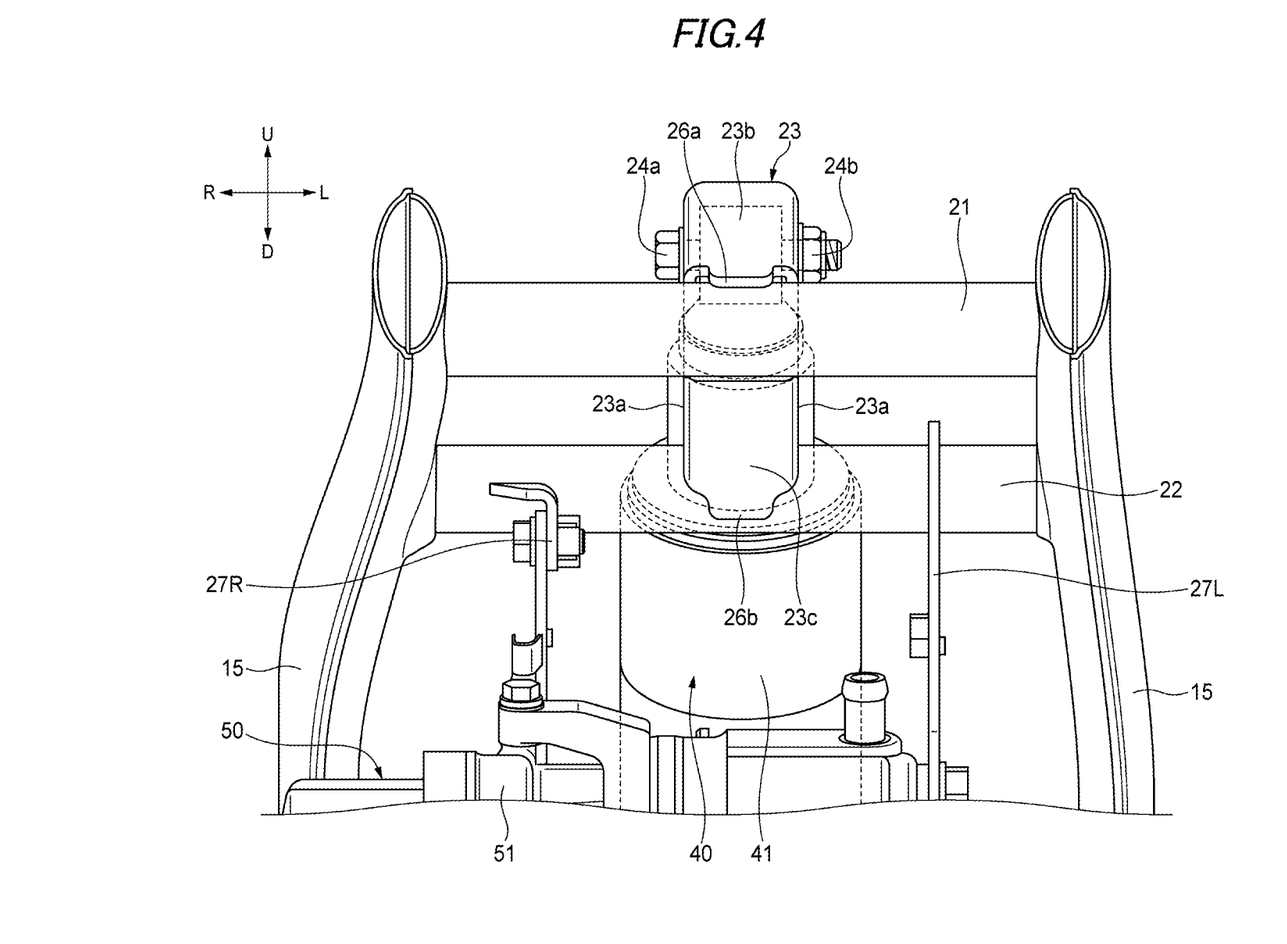
FIG. 4 is a front view of the periphery of the shock absorber mounting portion shown in FIG. 3.

As shown in FIGS. 3 to 5, engine hangers 27L, 27R are welded to the second cross tube 22 at left- and right-hand sides of the shock absorber mounting portion 23 so as to hold it therebetween. Then, the engine 50 is mounted on the engine hangers 27L, 27R. Thus, since the engine hangers 27L, 27R are mounted on the second cross tube 22, as shown in FIG. 3, a downward load of the engine 50 (inertial force, gravity thereof) F3 and the load F2 applied to the second cross tube 22 from the shock absorber 41 are offset against each other at the second cross tube 22 and the engine hangers 27L, 27R.

Figure 7:
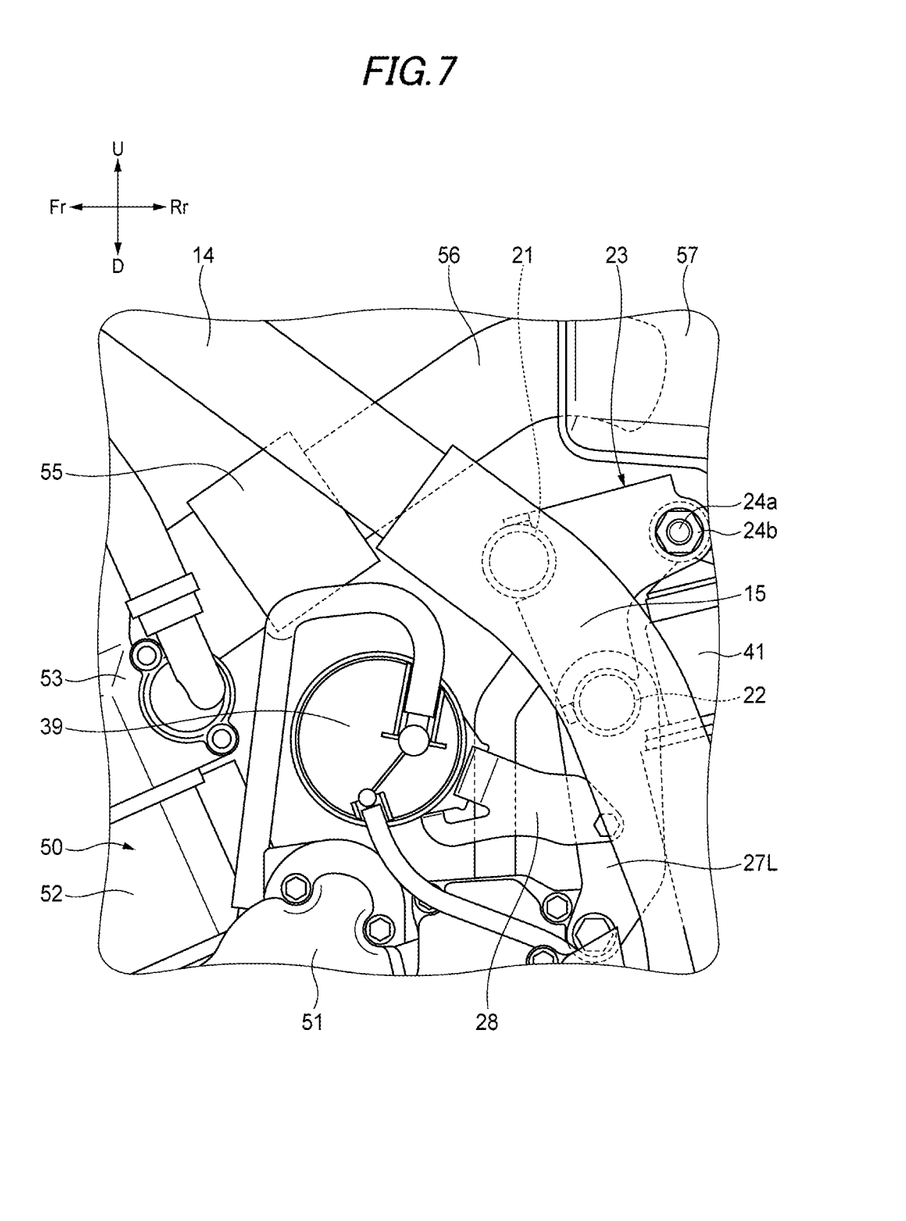
FIG. 7 is an enlarged left-hand side view of the periphery of a canister shown in FIG. 1.

Additionally, as shown in FIG. 7, a canister which temporarily adsorbs evaporated fuel within the fuel tank 34 is mounted on the engine hanger 27L which is mounted on a left-hand side of the vehicle via a bracket 28. The canister 39 is disposed at the rear of the cylinder block 52 and the cylinder head 53, above the crankcase 51 and below the throttle body 55 and the connecting tube 56.

As has been described heretofore, in accordance with the embodiment of the invention, in the body frame 11 of the motor cycle 10, the shock absorber mounting portion 23 may be mounted so as to interconnect the first cross tube 21 and the second cross tube 22. In addition, the shock absorber mounting portion 23 may be mounted so that the extension/contraction axis L1 of the shock absorber 41 and the line L2 passing through the center axis of the first cross tube 21 and the center axis of the second cross tube 22 are offset from each other in the side view of the vehicle in the right-left direction. According to this structure, the load F0 from the shock absorber 41 can be converted into moments by the shock absorber mounting portion 23 so that the load F0 can eventually be distributed to the first and second cross tubes 21, 22. By distributing the load F0 in that way, the shock absorber mounting portion 23 can be made small in size while ensuring the rigidity thereof, thereby making it possible to enhance the degree of freedom in laying out the constituent components of the vehicle 10. Specifically, by disposing the shock absorber 41 in a center in the right-left direction of the vehicle 10, the engine induction system can be passed above the shock absorber mounting portion 23 which is made small, and therefore, the motor cycle 10 can be streamlined.

In addition, in accordance with the body frame 11 for the motor cycle 10 of the embodiment, the engine hangers 27L, 27R which support the engine 50 may be mounted on the second cross tube 22. According to this structure, the downward load F3 of the engine 50 and the load F2 applied to the second cross tube 22 from the shock absorber 41 can be offset by the second cross tube 22 and the engine hangers 27L, 27R. By doing so, the rigidity of the second cross tube 22 can be ensured without making the second cross tube 22 heavy and thick, thereby making it possible to reduce the weight and size of the body frame 11.

In addition, in accordance with the body frame 11 for the motor cycle 10 of the embodiment, the first and second cross tubes 21, 22 may be disposed forwards and rearwards of the center line L3 of the curved portion 15a so that the center line L3 is positioned therebetween. According to this structure, the triangular construction is formed by the first and second cross tubes 21, 22 and the apex P of the curved portion 15a when viewed from the side of the vehicle, thereby making it possible to enhance the rigidity of the body frame 11.

In addition, in accordance with the body frame 11 for the motor cycle 10 of the embodiment, the shock absorber mounting portion 23 may have the substantially inverted L-shape when viewed from the side of the vehicle and the substantially U-shaped sectional shape. In addition, the shock absorber pivotally supporting portions 24 may be provided at the upper end portions of the shock absorber mounting portion 23. The shock absorber mounting portion 23 may be joined to the first cross tube 21 so that the corner portion 25 thereof is brought into abutment with the first cross tube 21 from thereabove. According to this structure, the load F0 from the shock absorber 41 is converted into the moments M1, M2 which work respectively about the joint portions between the shock absorber mounting portion 23 and the first and second cross tubes 21, 22 as the fulcrums, and the moment M1 applied to the first cross tube 21 from the shock absorber mounting portion 23 is directed so as to fasten the first cross tube 21 from thereabove. Thus, the rigidity of the joint portion between the first cross tube 21 and the shock absorber mounting portion 23 can be ensured without increasing excessively the welding strength of the joint portion.

In addition, in accordance with the body frame 11 for the vehicle 10 of the embodiment, the shock absorber mounting portion 23 may have the first claw portion 26a which is formed at the joint portion with the first cross tube 21 so as to extend over part of the first cross tube 21 and the second claw portion 26b which is formed at the joint portion with the second cross tube 22 so as to extend to the front of the second cross tube 22. According to this structure, the first claw portion 26a and the second claw portion 26b are provided so as to correspond to the moments M1, M2 which are applied to the shock absorber mounting portion 23, thereby making it possible to enhance the rigidity of the shock absorber mounting portion 23.

In addition, in accordance with to the body frame 11 for the vehicle 10 of the embodiment, the engine hangers 27L, 27R may have the right engine hanger 27R on the right side of the shock absorber mounting portion 23 and the left engine hanger 27L on the left side of the shock absorber mounting portion 23 so that the shock absorber mounting portion 23 is sandwiched by the engine hangers 27L, 27R. According to this structure, the downward load F3 of the engine 50 is distributed to the two engine hangers 27L, 27R and is dispersed further by the pivot frame portions 15 and the shock absorber mounting portion 23 for transmission. Therefore, the rigidities at the joint portion between the engine hangers 27L, 27R and the second cross tube 22, the joint portion between the second cross tube 22 and the pivot frame portions 15 and the joint portion between the second cross tube 22 and the shock absorber mounting portion 23 can be ensured without increasing excessively the welding strengths at those joint portions.

According to the body frame 11 for the vehicle 10 of the embodiment, the shock absorber mounting portion 23 is made small in size, and therefore, the connecting tube 56 may be disposed in the space defined below the seat 35 and above the shock absorber mounting portion 23.

The invention is not limited to the embodiment that has been described heretofore but can be altered or modified variously as required without departing from the spirit and scope of the invention.

DESCRIPTION OF REFERENCE NUMERALS AND SIGNS 10 motor cycle (straddle-type vehicle); 11 body frame; 12 head tube; 13 main frame; 14 main tube portion; 15 pivot frame portion; 15a curved portion; 16 rear frame; 21 first cross tube; 22 second cross tube; 23 shock absorber mounting portion; 23a plate member; 23b upper plate; 23c front plate; 24 shock absorber pivotally supporting portion; 25 corner portion; 26a first claw portion; 26b second claw portion; 27L, 27R engine hanger; 31 front fork; 35 seat; 40 rear wheel suspension system; 41 shock absorber; 42 first linkage; 43 second linkage; 50 engine; 56 connecting tube; 57 air cleaner box; L1 extension/contraction axis of shock absorber; L2 line interconnecting axes of first and second cross tubes; L3 center line of curved portion.

The invention claimed is:

1. A body frame of a straddle-type vehicle comprising:
a head tube adapted to steerably support a front fork;
a pair of left and right main frames extending rearwards from the head tube;
a shock absorber mounting portion on which an upper end portion of a shock absorber is mounted between the left and right main frames;
a first cross tube which interconnects the pair of left and right main frames in a right-left direction; and
a second cross tube which is disposed rearwards of the first cross tube and interconnects the pair of left and right main frames in the right-left direction,
wherein the shock absorber mounting portion is rigidly joined to the first cross tube and the second cross tube, and
wherein the shock absorber mounting portion is mounted so that an extension/contraction axis of the shock absorber and a line which passes through a center axis of the first cross tube and a center axis of the second cross tube are offset from each other in a vehicle front-rear direction, in a side view of the vehicle.

2. The body frame of a straddle-type vehicle according to claim 1,
wherein an engine hanger, on which an engine is capable of being mounted, is mounted on the second cross tube.

3. The body frame of a straddle-type vehicle according to claim 2,
wherein the engine hanger includes a right engine hanger mounted at a right side of the shock absorber mounting portion and a left engine hanger mounted at a left side of the shock absorber mounting portion, and
wherein the shock absorber mounting portion is disposed between the right engine hanger and the left engine hanger.

4. The body frame of a straddle-type vehicle according to claim 1,
wherein each of the left and right main frames includes a main tube portion and a pivot frame portion connected to a rear end portion of the main tube portion,
wherein the pivot frame portion has at least one curved portion which is curved downwards, and
wherein the first cross tube and the second cross tube are disposed so as to be offset in the vehicle front-rear direction with a center line of the curved portion disposed therebetween.

5. The body frame of a straddle-type vehicle according to claim 1,
wherein the shock absorber mounting portion has a substantially inverted L-shape in the side view of the vehicle and a substantially U-shaped sectional shape,
wherein the shock absorber mounting portion has a shock absorber pivotally supporting portion at an upper end portion thereof, and
wherein the shock absorber mounting portion is joined to the first cross tube so that a corner portion of the shock absorber mounting portion is brought into abutment with the first cross tube from thereabove.

6. The body frame of a straddle-type vehicle according to claim 1, wherein the shock absorber mounting portion includes:
- a first claw portion formed at a joint portion with the first cross tube and extending over the first cross tube; and
- a second claw portion formed at a joint portion with the second cross tube and extending to a front of the second cross tube.

7. The body frame of a straddle-type vehicle according to claim 1,
wherein an engine is capable of being mounted in a space defined between the left and right main frames,
wherein an air cleaner box is capable of being mounted in a space defined between rear frames of the body frame, and
wherein a connecting tube which interconnects a cylinder head of the engine and the air cleaner box is capable of being disposed in a space defined below a seat and above the shock absorber mounting portion.

* * * * *